April 1, 1924.
N. L. MORTENSEN
1,488,934
MOTOR CONTROLLER
Filed June 21, 1917
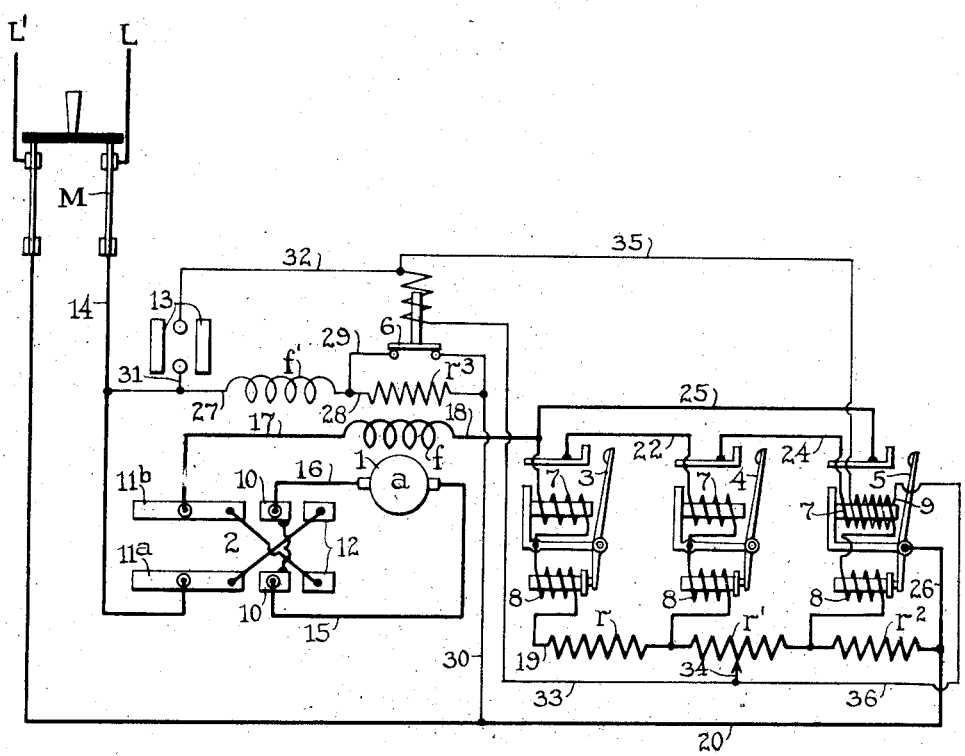
Inventor
Niels L. Mortensen
By Frank A. Hubbard
Attorney Patented Apr. 1, 1924.

1,488,934

UNITED STATES PATENT OFFICE.

NIELS L. MORTENSEN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed June 21, 1917. Serial No. 176,033.

*To all whom it may concern:*

Be it known that I, NIELS L. MORTENSEN, a subject of the King of Denmark, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers and more particularly to reversing controllers having electro-responsive accelerating or speed regulating switches provided with shunt windings.

In practice, considerable difficulty has been experienced with such controllers due to the tendency of the shunt windings to operate the accelerating or speed regulating switches prematurely upon quick reversals of the controlled motors, and the present invention has among its objects to provide a controller which will obviate such difficulty.

A further object is to provide a controller wherein the shunt winding or windings of the aforesaid switch or switches will be subjected to control by the motor during the periods of reversal thereof to insure against premature operation of said switch or switches.

Other objects and advantages will hereinafter appear.

The accompanying drawing illustrates diagrammatically one embodiment of the invention wherein shunt windings are employed for an accelerating switch and a field regulating switch and the same will now be described.

Referring to the drawing, the same shows a reversible compound motor 1 having an armature $a$, a series field winding $f$ and a shunt field winding $f'$, said motor to be controlled through the medium of starting resistances $r$, $r'$ and $r^2$ and a shunt field resistance $r^3$.

The controller illustrated comprises a contact drum 2 to reverse the flow of current through the motor armature $a$, electro-responsive accelerating switches 3, 4 and 5 to control the resistances $r$, $r'$ and $r^2$ respectively and an electro-responsive field regulating switch 6 to control the resistance $r^3$.

Each of the accelerating switches is of the so-called "lockout" type having an operating winding 7 and a lockout winding 8 connected in series with one another and in series with the motor armature whereby each switch operates in a well known manner to exclude its respective resistance subject to control by the current value of the motor circuit. Also, the accelerating switches are interconnected whereby the inclusion in circuit of the windings of switch 4 requires prior closure of switch 3 and inclusion in circuit of the windings of switch 5 requires prior closure of switch 4. Further, the circuit arrangement is such that switch 5 in closing short-circuits switches 3 and 4, together with the operating and lockout windings of all three switches and said switch 5 is provided with a shunt winding 9 for holding the same in closed position.

The field regulating switch 6, which is normally closed to short circuit field resistance $r^3$, is provided with a single shunt operating winding which, as will appear, is connected in parallel with the holding winding 9 of accelerating switch 5.

The contact drum 2 has contacts 10 co-operating in neutral position of said drum to establish a dynamic braking circuit for the motor armature, contacts $11^a$ and $11^b$ to complete the motor circuit for operation of the motor in one direction and contacts 12 for completing the motor circuit for reverse operation. Also, the contact drum is provided with co-operating contacts 13 to complete the circuits of the winding of field regulating switch 6 and the holding winding of accelerating switch 5 when said drum is moved to either running position and to interrupt the circuit of said windings when said drum is returned to neutral position.

Upon movement of the contact drum to either running position the switches 3, 4 and 5 are rendered responsive to exclude the starting resistances $r$, $r'$ and $r^2$ progressively for automatic acceleration of the motor. Also, the field regulating switch 6 is rendered responsive to include the field resistance $r^3$ but the response of said switch is delayed by the connections now to be described until after removal of all of the starting resistance.

The winding of switch 6 and the parallel holding winding 9 of switch 5 are connected on one side to starting resistance $r'$ at an intermediate point and thence through a portion of said resistance and resistance $r^2$ to one of the supply lines, while said windings are connected on the other side thereof through contacts 13 of the drum to the other supply line.

Accordingly, considering the winding of switch 6 it will be seen that the same is, upon initial starting of the motor, connected in shunt with the motor armature, series field, starting resistance $r$ and a portion of starting resistance $r'$, whereby the current through said winding is proportional to the motor current. Said winding, moreover, is designed to be ineffective for opening the switch 6 until after the motor has accelerated and the starting resistance has been excluded from circuit, whereby the applied voltage across said winding is increased sufficiently to cause opening of said switch. The resistance of said winding being high as compared with said starting resistance, the current through said winding is not appreciably reduced by the passage thereof through the designated portions of said starting resistance.

The holding winding 9, being connected in parallel with the winding of switch 6 last described, is subjected to like conditions, and said winding, furthermore, is designed to be ineffective for closing the switch 5 when fully open.

At the moment of reversal of the motor connections to the line the counter E. M. F. voltage of the motor is added to the line voltage, thus subjecting the starting resistance to the sum of these two voltages, and if said resistance be regarded as divided in two sections, the value of one section being proportional to the line voltage and the value of the other section being proportional to the counter E. M. F. of the motor, the potential at the intermediate point where said sections unite will equal the potential at the point where the motor is connected to the line.

Upon movement of the master controller from one running position to the reverse position, the connections of the motor armature to the line are reversed and the joint circuit of the shunt windings of switches 5 and 6 is interrupted and immediately re-established, the interruption of said circuit permitting switch 5 to open for reincluding the starting resistance and permitting switch 6 to close for restoring the motor shunt field to full strength. Upon re-establishment of said joint circuit, assuming the same to be connected directly across the line in accordance with ordinary practice, a relatively high voltage is impressed upon the shunt windings of the switches 5 and 6 before the same have been afforded time to open and close respectively in response to the previous circuit interruption, thus tending to cause said switches to act prematurely.

But with one side of said shunt windings connected between the motor and the line and the other side of said windings connected to the proper intermediate point in the starting resistance, as described, there is no drop in potential across said windings at the moment of reversal and premature response of said switches is prevented.

As the motor slows down, stops and accelerates in the reverse direction, the voltage across said windings is increased until, following exclusion of the starting resistance, said windings are rendered fully effective as upon ordinary starting of the motor.

It is, of course, to be understood that the connection of the windings to resistance $r'$ is arbitrary and that the connection may be made to any point on the series resistance which will insure no drop or a sufficiently small drop in potential across the windings to insure against premature response of the switches.

Upon movement of the drum controller to the right from the dynamic braking position shown to running position, the motor circuit is established as follows: from line L through main switch M by conductor 14 to drum contact 11ª, thence by conductor 15 through the motor armature $a$, by conductor 16 to the drum contact 11ᵇ, and by conductor 17 through series field $f$, thence by conductor 18 through closing winding 7 and lockout winding 8 of switch 3, thence by conductor 19 through resistances $r$, $r'$ and $r^2$ in series and by conductor 20 to main switch and line L'.

Closure of switch 3 serves to exclude resistance $r$ from the motor circuit which then extends through the closing winding 7 of said switch, as last traced, through said switch, by conductor 22 through both windings of switch 4 and through resistances $r'$ and $r^2$ as last traced. Closure of switch 4 serves in like manner to exclude resistance $r'$ and energize the series windings of switch 5 by conductor 23, while closure of switch 5 excludes resistance $r^2$ and the series windings of all the switches from the motor circuit, which thereafter extends from conductor 18 as previously traced, by conductor 25 through said switch 5 and by conductors 26 and 20 to main switch M and line L'.

The shunt field circuit extends from conductor 14 by conductor 27 through the shunt field $f'$, thence by conductor 29 through normally closed switch 6 and by conductor 30 to conductor 20, while opening of said switch serves to include the resistance $r^3$ in said circuit.

The energizing circuit of switch 6 extends from conductor 27 by conductor 31 through drum contacts 13 and by conductor 32 through the winding of said switch, thence by conductor 33 to the intermediate tap 34 in resistance $r'$.

The circuit of holding coil 9 extends to conductor 32 as last traced, thence by conductor 35 through said coil and by conductor 36 to the tap 34.

What I claim as new and desire to secure by Letters Patent is:

1. In combination, an electric motor, a supply circuit therefor, plugging means for said motor, a series resistance for said motor and electro-responsive switches for progressively excluding portions of said resistance each of said switches having a series winding to close the same and one of said switches having a shunt winding to hold the same in closed position, said latter winding being connected to the motor circuit throughout the plugging period at points which as the result of the plugging action are of reduced potential difference.

2. In combination, an electric motor having shunt field, a supply circuit and plugging means for said motor, a series resistance for said motor, a field resistance and an electro-responsive switch for controlling said field resistance, said switch having a shunt control winding connected to the motor circuit throughout the plugging period at points which as the result of the plugging action are of reduced potential difference.

3. In combination, an electric motor having a shunt field, a supply circuit and plugging means for said motor, a series resistance for said motor, a field resistance and electro-responsive switches for excluding said resistances, said switches having shunt windings arranged in parallel with each other and connected to the motor circuit throughout the plugging period at points which as the result of the plugging action are of reduced potential difference.

4. In combination, an electric motor, a supply circuit therefor, reversing means for said motor, a series resistance for said motor and an electro-responsive switch for excluding said resistance, said switch having series and shunt windings to respectively close and hold the same, said latter winding being connected on one side to said supply circuit and on its other side to said resistance at an intermediate point.

5. In combination, an electric motor having a shunt field, a supply circuit and reversing means for said motor, a series resistance for said motor, a field resistance and an electro-responsive switch for controlling said field resistance, said switch having a shunt control winding connected on one side to said supply circuit and on its other side to said series resistance at an intermediate point.

6. In combination, an electric motor having a shunt field, a supply circuit and reversing means for said motor, a series resistance for said motor, a field resistance and electro-responsive switches for excluding said resistances, said switches having shunt windings arranged in parallel with each other and connected on one side to said supply circuit and on their opposite sides to said series resistance at an intermediate point.

7. In combination, an electric motor having a shunt field, a supply circuit and reversing means for said motor, a series resistance and a field resistance for said motor, and electro-responsive switches for governing the inclusion and exclusion of said resistances, said series resistance switch having a series operating winding and a shunt holding winding, said field resistance switch having a shunt operating winding, the shunt windings of said switches being connected on one side thereof to said supply circuit and on their opposite sides to said series resistance at an intermediate point.

8. In combination, an electric motor, a supply circuit therefor, reversing means for said motor, a series resistance for said motor and an electro-responsive control switch for said motor having a shunt control winding connected on one side to said supply circuit and on its other side to said resistance at an intermediate point, said switch when fully opened being unresponsive to said shunt winding.

9. In combination, an electric motor, a supply circuit therefor, reversing means for said motor, a series resistance for said motor and an electro-responsive switch for excluding said resistance, said switch having a shunt control winding connected on one side to said supply circuit and on its other side to said resistance at an intermediate point, said switch having means functioning when the same is fully opened to insure against closure thereof by said shunt winding.

10. In combination, an electric motor, a supply circuit therefor, reversing means for said motor, a series resistance for said motor and an electro-responsive switch for excluding said resistance, said switch having series and shunt windings to respectively operate and hold the same, said latter winding being connected on one side to said supply circuit and on its other side to said resistance at an intermediate point, certain of said windings being adapted when said switch is fully open to insure against closure thereof by said shunt winding.

In witness whereof, I have hereunto subscribed my name.

NIELS L. MORTENSEN.